United States Patent Office 3,445,648
Patented May 20, 1969

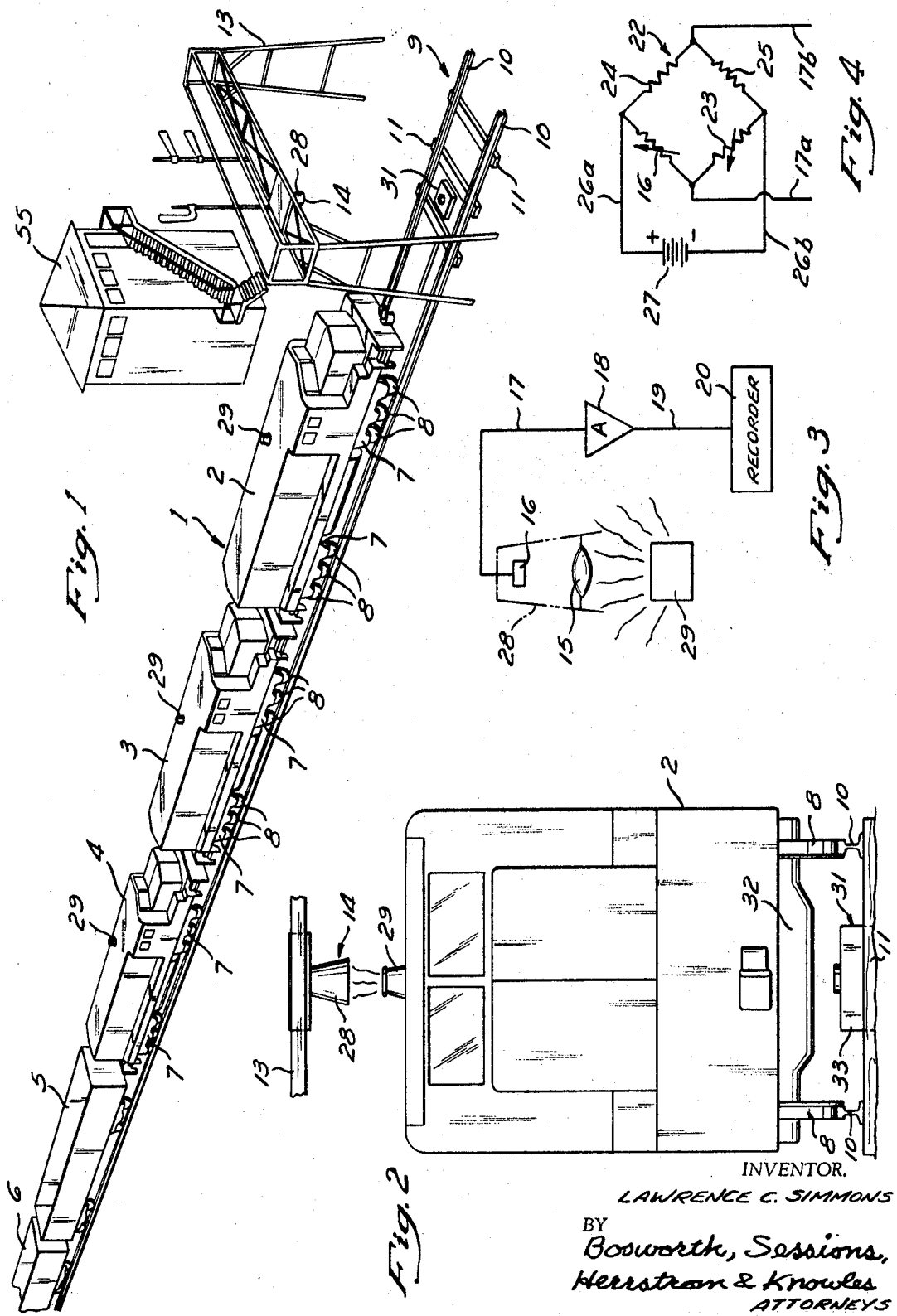

3,445,648
APPARATUS FOR CHECKING OPERATION OF
POWER-PRODUCING COMPONENTS
Lawrence C. Simmons, Cleveland, Ohio, assignor to
Cleveland Technical Center, Inc., Cleveland, Ohio, a
corporation of Delaware
Filed Dec. 7, 1966, Ser. No. 599,952
Int. Cl. B61k 13/00; B61c 17/00
U.S. Cl. 246—169                                5 Claims

ABSTRACT OF THE DISCLOSURE

This disclosure relates to apparatus and method for checking the operation of power-producing components such as the diesel engines or electric traction motors of diesel-electric locomotives, comprising heat-sensing means adapted to sense heat emitted by a power-producing component and means providing an indication of temperature of such component.

BACKGROUND OF INVENTION

Field of invention

This invention relates to apparatus and method for checking the operation of power-producing components, and more particularly to apparatus and method for checking the operation of power-producing components of railroad locomotives while they are traveling.

While the invention may be employed in checking on the operations of various types of locomotives, for convenience it will be discussed below in connection with checking on the operation of power-producing components of diesel-electric locomotive units, since they are most commonly used at present and since the invention provides particularly important advantages when employed for such use.

It is common practice to couple several single diesel-electric locomotive units in series to make up one locomotive. The engineman who controls operation of the locomotive then is at the front of the first unit; in this location he cannot readily determine whether the diesel engine in any of the following units is not operating properly while the locomotive is traveling, since each of these units independently applies the power that it develops to its traction wheels, since the control exerted by the engineman is only the control of the diesel engine portion of each unit, and since it is a time-consuming task to visit each unit personally to inspect it at frequent intervals.

It is also impossible for the engineman to determine conclusively whether all electric traction motors in the trucks of the locomotive units are operating properly when the locomotive unit is traveling, since the traction motors are then inaccessible to inspection. Sometimes a motor may not deliver energy to the wheels at all, as because of circuit failure; and at other times it can run too hot because of overloading, malfunctioning, or faults in the cooling system such as blower motor failure or plugging or leakage of air ducts.

Description of the prior art

Applicant knows of no prior art apparatus or method for checking on the operation of locomotive units from a location off the locomotive unit while the locomotive unit is traveling on a track.

SUMMARY OF INVENTION

It is an object of the invention to provide apparatus whereby the proper operation of locomotive units can be detected and indicated from a location off the locomotive units while they are traveling. Another object is the provision of a system whereby malfunctioning of a power-producing component of a locomotive unit can be detected at the track while the locomotive unit is traveling and reported or recorded at a place where the engineman can be readily notified.

According to the invention, a temperature-detecting unit, such as an infrared detector unit may be mounted adjacent the track in a position where it can detect heat or infrared radiation emanating from the power-producing unit of the locomotive that it is desired to check, as the unit moves along the track, the temperature of the component indicating whether the component is operating properly. As an example, the detector unit may be mounted above the track at a stationary location where it can sense the temperatures at the exhaust stacks of diesel engine power-producing components of locomotive units traveling on the track and generate signals that, through suitable amplification and recorder means, can indicate, as on a tape at a suitable location, whether the temperatures of the gases emanating from the exhaust stacks are normal or whether they are too high, too low, or nonexistent. In addition, or alternatively, another detector unit may be located between the track rails in a position where it can sense the temperatures of the traction motor power-producing components of a locomotive unit, and send signals which can be amplified and transmitted to a suitable location where they can be received by recorder means to indicate whether any traction motor is not operating properly. When the recorder means indicates that a unit is not operating satisfactorily, the engineman can be notified and the train halted so that investigation can be made and corrective action taken.

BRIEF DESCRIPTION OF DRAWINGS

The above objects and features of the invention will become apparent from the following description in connection with the accompanying drawings, in which:

FIGURE 1 is a perspective of a railroad train having a locomotive made up of three locomotive units, passing under a signal bridge on which is mounted an infrared radiation or heat-sensing detector unit for detecting stack temperatures, and traveling over a similar detector unit for detecting traction motor temperatures;

FIGURE 2 is a view showing an end elevation of a locomotive passing between the upper and lower detector units, with its exhaust stack directly beneath the upper unit;

FIGURE 3 is a schematic diagram of a system embodying a detector unit, amplification means and recorder means;

FIGURE 4 is a schematic electrical bridge circuit diagram of the detector unit;

DESCRIPTION OF PREFERRED EMBODIMENTS

Figure 5:
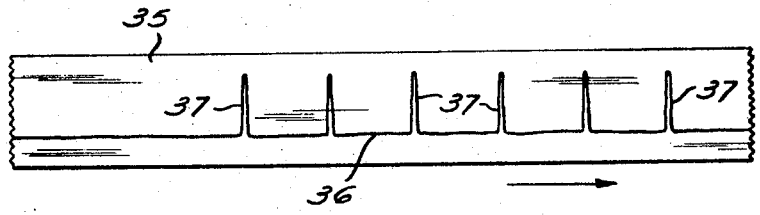
FIGURE 5 is a view of a portion of a tape bearing a recorded indicia showing normal operation of all diesel engines of a six-unit locomotive as detected and recorded from exhaust stack temperatures by apparatus embodying the present invention.

In the drawings, 1 designates a locomotive made up of three conventional diesel-electric units 2, 3 and 4, pulling cars 5, 6 of a train of cars. Each locomotive unit has two trucks 7 of six wheels 8 each. The locomotive travels on a conventional track made up of conventional rails 10 carried by cross ties 11.

A conventional signal bridge 13 carries a heat or infrared radiation detector unit 14. This detector unit 14 comprises, as shown in FIGURE 3, a focusing lens 15 of infrared-transmitting material adapted to image incident heat or infrared radiation on a heat or infrared radiation-sensitive detector element 16 of any suitable type, such as a known thermistor flake bolometer or photoconductor having the ability to transmit an electrical signal of a characteristic that varies in accordance with the heat or infrared radiation to which it is exposed.

The detector unit is connected in a conventional manner by electrical circuit means generally indicated by 17 to amplifier means 18 to amplify the electrical signal from element 16 so it can be transmitted by circuit means generally indicated by 19 to suitable recorder means 20, preferably a conventional moving pen recorder that is actuated by the signals to indicate responses from the detector on a moving tape.

As shown in FIGURE 4, the element 16 is included in a bridge circuit 22 also comprising a temperature compensating resistor 23, resistors 24 and 25, leads 26a, 26b connecting two corners of the bridge to a source of electrical energy 27, and leads 17a and 17b connecting to the other corners of the bridge forming part of a circuit means 17 connected to the amplifier means 18. Amplifier means 18 may be of conventional design, adapted to produce pulses resulting in temperature indication markings of desired shape on the recorder tape.

The detector unit 14 comprises shielding means 28 in which the lens 15 and element 16 are located; the unit 14 is located above the track 9 in a proper position to clear the locomotive and to have its lens 15 and element 16 exposed to the heat emitted from the stacks 29 through which discharge the exhaust gases emitted by the diesel engines of the locomotive units as the locomotive travels.

The illustrated apparatus also includes a detector unit 31 supported from the track bed between the rails 10, in a position where it can scan the traction motors 32 of the locomotive units 2, 3, and 4 to sense their temperatures.

The detector unit 31, similarly to unit 14, may comprise (FIGURES 3 and 4) a lens 15, heat-sensitive element 16, forming part of a bridge 22 connected by circuit means 17 to amplifier means 18, which in turn is connected to recorder means 20 that is preferably of the type that records indicia applied to a moving tape by a moving pen. The detector unit and lens, as well as a portion of the circuitry if desired, may be enclosed in a suitable shielding protective enclosure 33.

FIGURE 5 depicts a portion of a tape 35 produced by a recorder 20 of the temperatures at the stacks of a six-unit diesel-electric locomotive, when all diesel engines are operating normally and developing full power and the locomotive is traveling at a substantially uniform speed. The tape is made by a moving pen of a conventional recorder that is actuated to move transversely of the tape by signals from the detector unit 14 of the system previously described, to mark a line 36 on the tape when the tape travels in the direction indicated by the arrow at a substantially uniform speed. As shown by this tape record, normal operation at full power of all diesel engines is indicated because the generally vertical portions 37 of lines 36 are all of equal height, the magnitude of which height is characteristic of normal operation.

Figure 6:
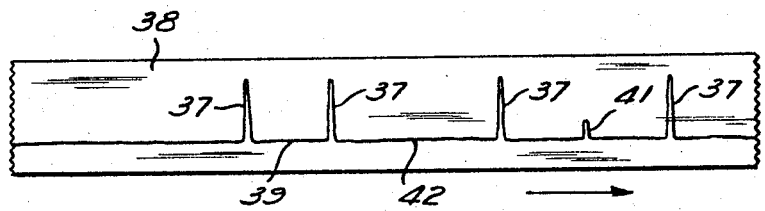
FIGURE 6 is a portion of a similarly produced tape bearing recorded indicia of the operation of a six-unit locomotive in which the diesel engines of the second and fourth units are improperly operating.

FIGURE 6 shows a portion of a tape 38, produced by the same system embodying detector 14, recording stack temperatures of a six-unit locomotive in which the diesel engines on the second and fourth units are operating improperly; the record shows that the diesel engine on the second unit is idling and not developing full power, as indicated by the short generally vertical portion of marked line 39 indicating low stack temperatures; the tape also shows that the diesel engine on the fourth unit is not operating at all, since there is no record at 42 of any appreciable stack temperature. The other generally vertical portions 37 of the line 39 indicate normal exhaust stack temperatures and hence normal operations of the corresponding diesel engines, and provide a comparison standard by which it is determined that the other diesel engines are operating improperly or not at all.

Figure 7:
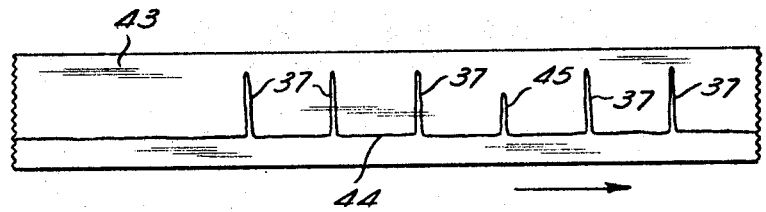
FIGURE 7 is a portion of a similarly produced tape for a six-unit locomotive showing improper operation of the diesel engine of the third unit.

FIGURE 7 shows a tape 43 having a line 44, produced by the system embodying detector 14, recording by stack temperature indications a situation in which the diesel engine of the third unit is operating at normal speed but not developing power sufficient to cause its stack temperature to rise to the level of the other units which are developing full power, as indicated by the lower height of corresponding generally vertical portion 45 of line 44 in comparison with the heights of the line portions 37 recording the normal stack temperatures and hence normal operation of the diesel engines of the other locomotive units. Such a condition in which the stack temperature is lower than normal, but higher than either condition recorded in FIGURE 6, usually arises because there is malfunction in the electrical portion of the locomotive unit so that electrical power is not being developed although the third diesel is operating at proper speed.

Figure 8:
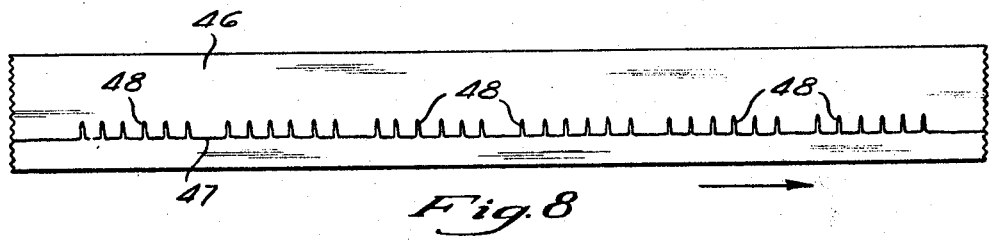
FIGURE 8 is a portion of a tape bearing recorded indicia showing normal operation of all electric traction motors of a six-unit locomotive, as detected and recorded from traction motor temperatures by apparatus embodying the invention.

FIGURE 8 shows a portion of a tape 46 having a recording line 47 produced by a recorder 20 connected through amplifier means 18 to a heat-sensitive element 16 of a detector unit 31 that records traction motor temperatures of a locomotive, made up of six units, traveling at substantially uniform speed. The recorder 20 moved a pen transversely of a tape moving at substantially uniform speed in response to signals emanating from detector unit 31, to indicate the temperatures of the traction motors 32 of all locomotive units traveling above the detector unit 31. The uniformity of height and proper magnitude of height of all generally vertical portions 48 of line 47 indicate that all six traction motors of each of the six locomotive units are operating properly.

Figure 9:
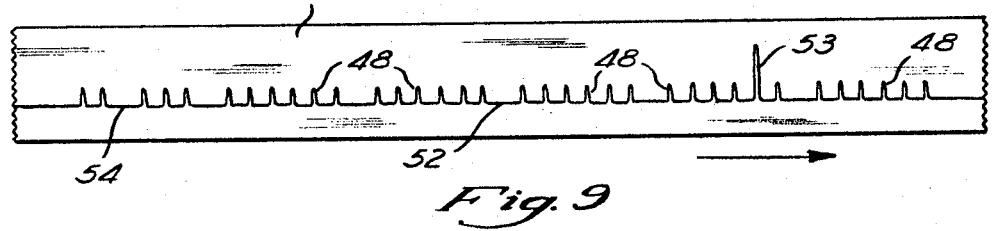
FIGURE 9 is a portion of a similarly produced tape bearing indicia showing malfunctioning of traction motors on the second and sixth units of the locomotive.

FIGURE 9 shows a portion of a tape 51 carrying a marked line 52 made by apparatus like that that made the line of FIGURE 8, for each of six traction motors of six locomotive units traveling at substantially uniform speed. In this case, however, the tape shows by the excessively high line portion 53 that the second motor of the second locomotive unit has a much higher than normal operating temperature, which indicates that the motor is running hot due to some malfunction of the equipment; and the tape also shows, by the absence of a vertical portion at 54, that the fourth motor of the sixth unit has no measurable temperature, which indicates that the motor is not developing power.

In each of these cases, the tape record can be read at a suitably convenient location such as tower 55 from which a signal can be sent in advance of the train to signal the enginemen to stop the locomotive so that an investigation can be made to determine the seriousness and extent of the difficulty. As a result of such investigation correction action may be taken if the problem is simple, or the locomotive showing malfunctions may be cut out of the train before serious damage or danger can result, or other corrective action can be taken.

While best results are obtained if the locomotive is traveling at substantially uniform speed since this eliminates variation in signal pulses that might arise from varying times of exposure of the detector units to radiation, useful results are obtained even if the locomotive speed is varying substantially while readings are taken because of the relatively short time it takes a locomotive, even if made of several units, to pass a detector unit, provided that the maximum and minimum speeds are substantial.

It is apparent that the invention overcomes the problems indicated above, and provides the advantages discussed above in the statement of objects and elsewhere. It is also apparent that various modifications may be made in the method and apparatus disclosed above, and that the method and apparatus of the invention can be used for checking the operation of locomotives or locomotive units different than those dsclosed above. It is intended that the patent shall cover, by suitable expression in the appended claims, whatever features of patentable novelty reside in the invention.

What is claimed is:

1. Apparatus for checking on operation of a plurality of power producing components of locomotive means traveling along a track, which power producing components emanate heat while operating, said checking being accomplished from a location off the locomotive means, comprising heat sensitive means for producing electrical signals in response to heat radiation, means mounting said heat sensitive means adjacent said track at a location off the locomotive means where it can sequentially receive heat radiations from said power producing components of said locomotive means, and means for translating the signals received from said heat sensitive means into indications of the temperatures of heat radiated from the power producing components of said locomotive means while traveling on said track, whereby from said indications a determination can be made as to improper operation of any of said power producing components of said locomotive means.

2. The apparatus of claim 1 in which said indication means is adapted to indicate graphically the indications of heat emitted by a plurality of said power producing components traveling sequentially along said track.

3. The apparatus of claim 1 in which said heat sensitive means is mounted to receive heat radiations from the exhaust stacks of locomotives traveling on said track.

4. The apparatus of claim 1 in which said heat sensitive means is mounted to receive heat radiations from electric traction motors driving traction wheels on locomotive means traveling on said track.

5. The apparatus of claim 1 comprising heat sensitive means mounted to receive heat radiations from the exhaust stacks of internal combustion engined locomotives traveling on said track and comprising heat sensitive means mounted to receive heat radiations from electric traction motors of said locomotives traveling on said track.

References Cited

UNITED STATES PATENTS

| | | |
|---|---|---|
| 2,621,239 | 12/1952 | Cade et al. |
| 2,880,309 | 3/1959 | Gallagher et al. _____ 246—169 |
| 3,015,803 | 1/1962 | Neu. |
| 3,056,106 | 9/1962 | Hendricks _____ 340—228 XR |
| 3,120,936 | 2/1964 | Pelino _____ 246—169 |
| 3,183,349 | 5/1965 | Barnes et al. _____ 246—169 |
| 3,183,350 | 5/1965 | Sibley _____ 246—169 |
| 3,294,969 | 12/1966 | Sibley _____ 246—169 |

FOREIGN PATENTS 940,785   3/1956   Germany.

OTHER REFERENCES

An article titled, "Industrial High Speed," by W. S. Gorrill appearing on pp. 112–114 in the March 1949 issue of "Electronics."

DRAYTON E. HOFFMAN, *Primary Examiner.*

U.S. Cl. X.R.

340—258